United States Patent
Liu (10) Patent No.: US 6,302,422 B1
(45) Date of Patent: Oct. 16, 2001

(54) POSITIONING DEVICE ADAPTED TO POSITION A REAR FRAME OF A FOLDABLE BICYCLE RELATIVE TO A FRONT FRAME WHEN THE FOLDABLE BICYCLE IS FOLDED

(75) Inventor: Shao-Chieh Liu, Taichung Hsien (TW)

(73) Assignee: Giant Manufacturing Co., Ltd., Taichung Hsien (TW)

(*) Notice: Subject to any disclaimer, the term of this patent is extended or adjusted under 35 U.S.C. 154(b) by 0 days.

(21) Appl. No.: 09/611,925

(22) Filed: Jul. 7, 2000

(51) Int. Cl.[7] .................................................. B62K 15/00
(52) U.S. Cl. ............................................ 280/287; 403/381
(58) Field of Search ............................... 280/287, 281.1, 280/278; 403/381

(56) References Cited

U.S. PATENT DOCUMENTS

| | | | |
|---|---|---|---|
| 693,521 | * | 2/1902 | Ishoy . |
| 4,160,540 | * | 7/1979 | Lindsey et al. ............. 254/134.3 PA |
| 4,422,663 | * | 12/1983 | Hon ...................................... 280/278 |
| 4,510,355 | * | 4/1985 | Atsumi et al. ......................... 200/47 |
| 5,052,706 | * | 10/1991 | Tsai et al. .............................. 280/287 |
| 5,136,863 | * | 8/1992 | Richardson ............................... 70/14 |
| 5,433,416 | * | 7/1995 | Johnson ............................. 248/475.1 |
| 5,590,895 | * | 1/1997 | Hiramoto ............................... 280/278 |

* cited by examiner

Primary Examiner—Kevin Hurley
(74) Attorney, Agent, or Firm—Harness, Dickey & Pierce, P.L.C.

(57) ABSTRACT

A positioning device is adapted to position a rear frame of a foldable bicycle relative to a front frame when the foldable bicycle is folded, and includes a rear anchoring member and a front anchored member adapted to be secured to rear and front wheel axles of the foldable bicycle and outboard to rear and front wheels, respectively. The rear anchoring member includes an outer lateral wall with upper and lower guiding surfaces, and a circumferential wall which extends from the outer lateral wall and which defines an insert slot extending rearwardly to form a first abutment wall. The front anchored member includes an inserted outer annular portion insertable into the insert slot, and a guided annular portion extending from an inner periphery of the inserted outer annular portion and having upper and lower contact parts so as to slidably engage the upper and lower guiding surfaces when the inserted outer annular portion is inserted into the insert slot. Thus, the front anchored member is retained on the rear anchoring member so as to position the rear frame relative to the front frame of the foldable bicycle.

8 Claims, 8 Drawing Sheets

POSITIONING DEVICE ADAPTED TO POSITION A REAR FRAME OF A FOLDABLE BICYCLE RELATIVE TO A FRONT FRAME WHEN THE FOLDABLE BICYCLE IS FOLDED

BACKGROUND OF THE INVENTION

1. Field of the Invention

This invention relates to a foldable bicycle, more particularly to a positioning device adapted to position a rear frame of a foldable bicycle relative to a front frame when the foldable bicycle is folded.

2. Description of the Related Art

Foldable bicycles are popular because they are convenient to transport and store. A conventional foldable bicycle includes a front frame and a rear frame which is foldable towards the front frame. However, there is no means for positioning the rear frame relative to the front frame when the foldable bicycle is folded. Thus, the rear frame is liable to spread itself relative to the front frame when transporting the foldable bicycle.

SUMMARY OF THE INVENTION

The object of the present invention is to provide a positioning device which can position a rear frame of a foldable bicycle relative to a front frame when the foldable bicycle is folded.

According to this invention, the positioning device includes a rear anchoring member and a front anchored member which are adapted to be secured to rear and front wheel axles and outboard to rear and front wheels of a foldable bicycle, respectively.

The rear anchored member includes an outer lateral wall which is adapted to be disposed opposite to the rear wheel in a first axial direction parallel to the first axis, and a circumferential wall which extends from a periphery of the outer lateral wall in the first axial direction and towards the rear wheel. The circumferential wall includes front and rear wall portions opposite to each other in a first direction transverse to the first axial direction. The front wall portion defines an insert slot which is disposed to extend towards the rear wall portion to form a first abutment wall that extends in the first axial direction and in a second transverse direction transverse to both the first axial direction and the first transverse direction. The first abutment wall defines a first distance with the front wall portion. The outer lateral wall includes upper and lower guiding surfaces which respectively extend in the first transverse direction and forwards to communicate with the front wall portion, and rearwards to upper and lower terminal portions that respectively define second and third distances with the front wall portion. The second and third distances are both shorter than the first distance. The upper and lower guiding surfaces respectively extend in the first axial direction, and are disposed to be spaced apart from each other by a fourth distance in the second transverse direction so as to confine a cutout portion which is communicated with the insert slot.

The front anchored member includes an inserted outer annular portion which has an annular inner periphery thereof surrounding the second axis. The inserted outer annular portion is of such a thickness in a second axial direction parallel to the second axis as to be insertable into the insert slot. The inserted outer annular portion includes a second abutment wall which is disposed to be forward to the front wheel axle in the first transverse direction, and which extends in the second axial direction so as to abut against the first abutment wall when the front wheel is folded to thereby bring the second abutment wall to face the first abutment wall, and when the inserted outer annular portion is inserted into the insert slot. A guided annular portion is disposed to extend from the annular inner periphery of the inserted outer annular portion in the first axial direction and towards the front wheel, and has upper and lower contact parts opposite to each other in the second transverse direction. As such, when the inserted outer annular portion is brought to be inserted into the insert slot in the first transverse direction, the upper and lower contact parts will slidably engage the upper and lower guiding surfaces, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
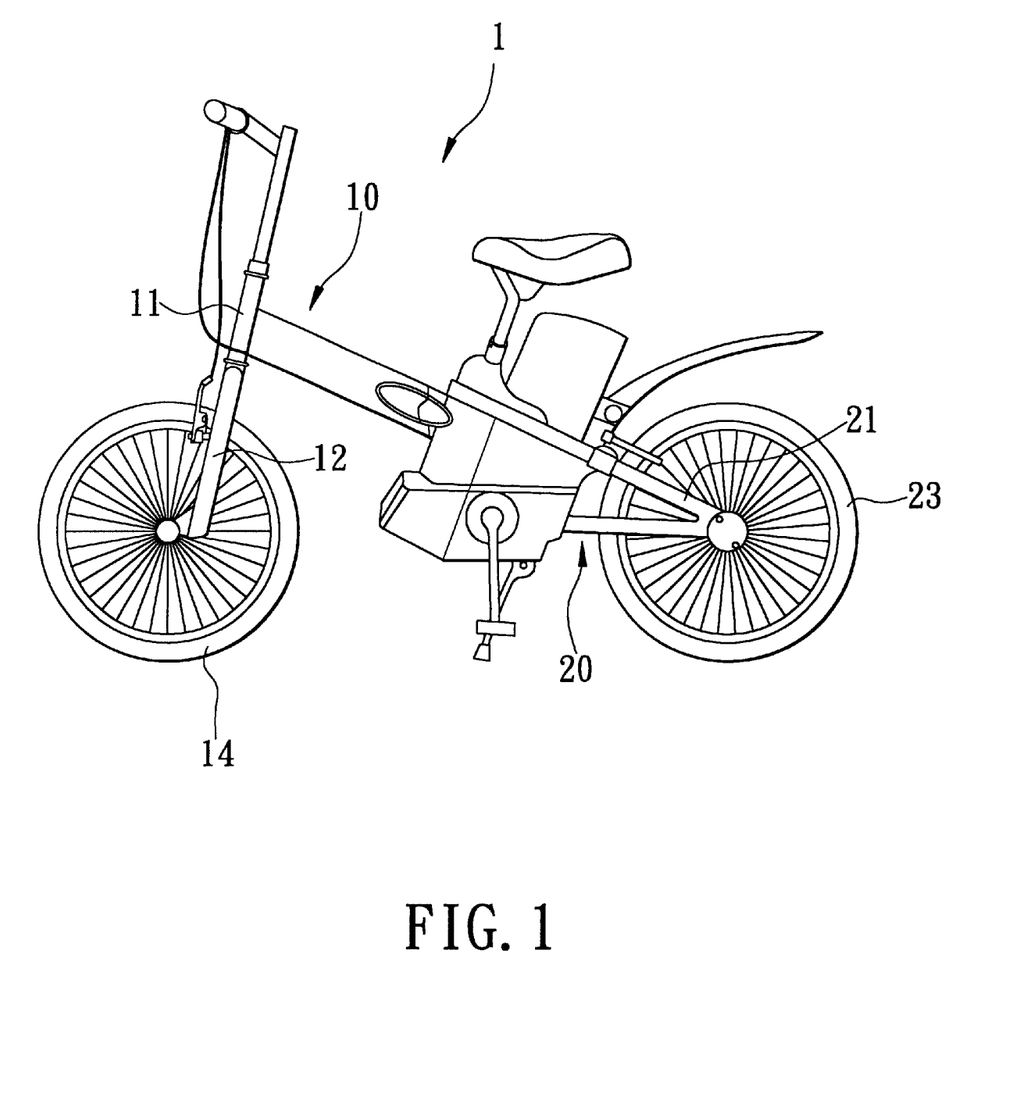
FIG. 1 is a schematic view of a foldable bicycle.
Figure 2:
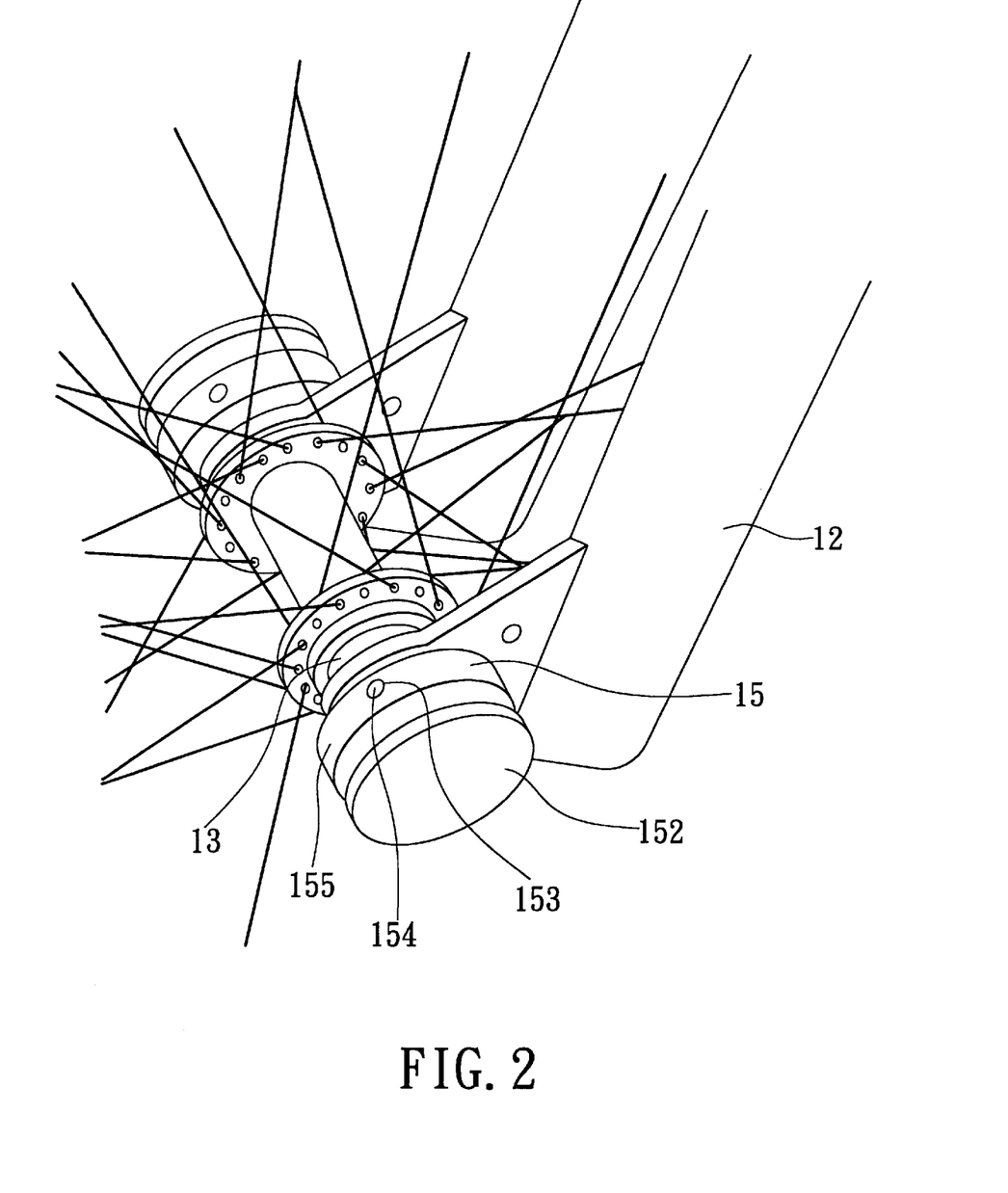
FIG. 2 is a perspective view of a front anchored member of a preferred embodiment of a positioning device according to this invention when mounted on a front wheel axle.
Figure 3:
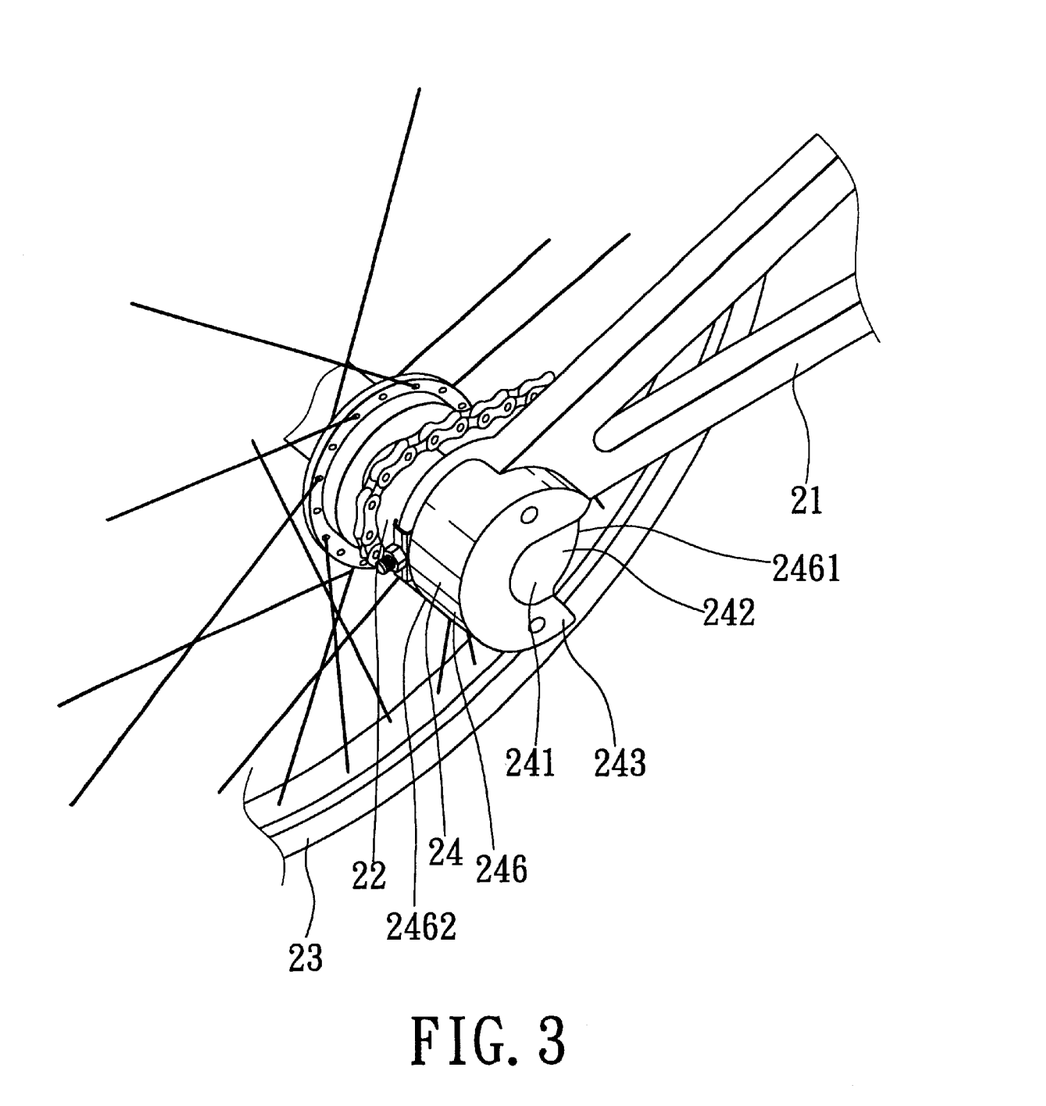
FIG. 3 is a perspective view of a rear anchoring member of the preferred embodiment when mounted on a rear wheel axle.
Figure 4:
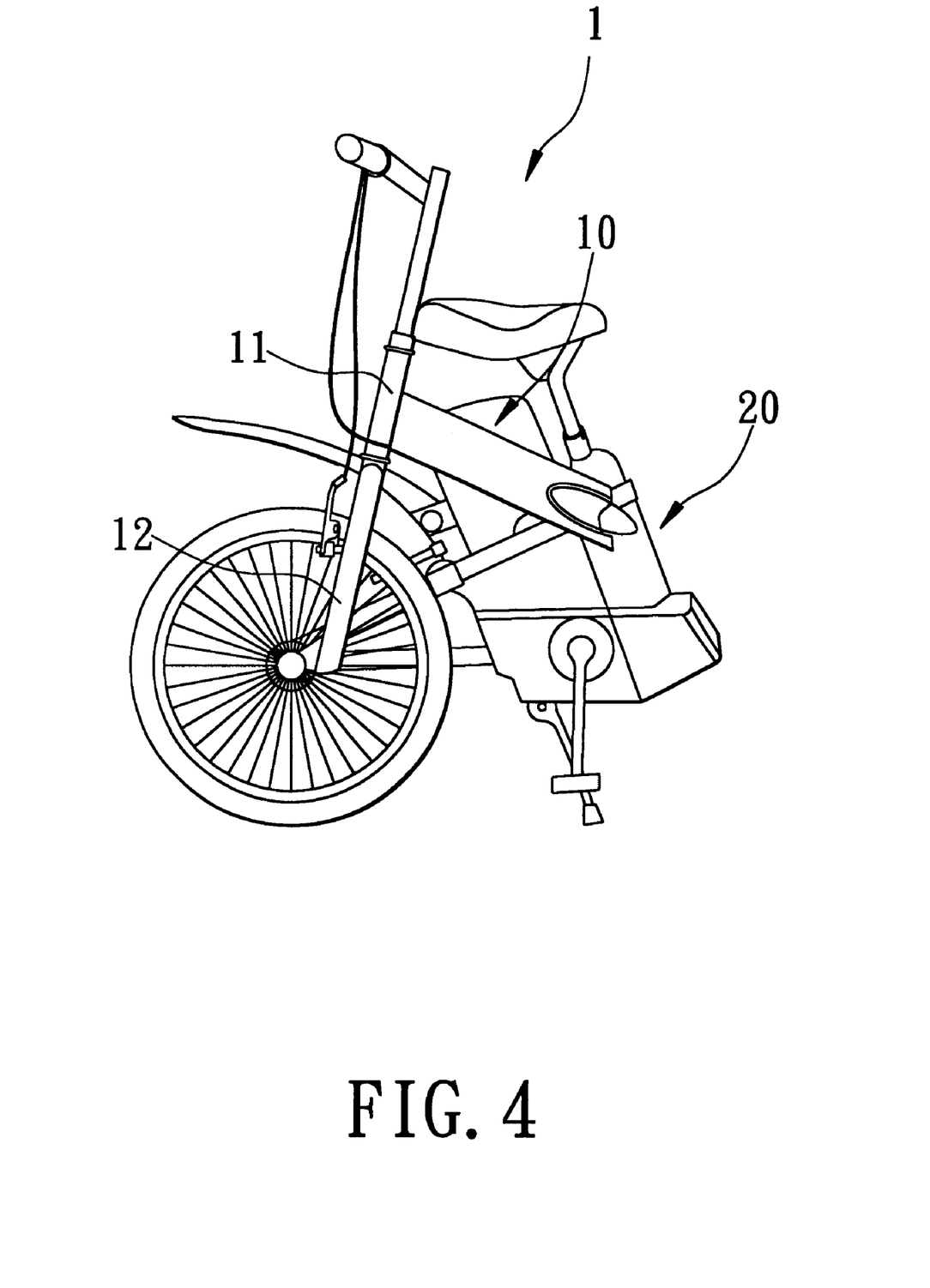
FIG. 4 is a schematic view showing the foldable bicycle of FIG. 1 in a folded state.

Referring to FIGS. 1, 2 and 3, the preferred embodiment of the positioning device according to the present invention is shown to comprise a front anchored member 15 and a rear anchoring member 24 which are adapted to be mounted on front and rear wheel axles 13,22, respectively, of front and rear frames 10,20 of a foldable bicycle 1. The front frame 10 includes a head tube 11 and a front fork blade 12 which is joined with the head tube 11. The front wheel axle 13 is mounted pivotally on the front fork blade 12, and is provided with a front wheel 14. The rear frame 20 includes a rear fork blade 21 and the rear wheel axle 22 which is mounted pivotally on the rear fork blade 21 and which is provided with a rear wheel 23. The front and rear wheel axles 13,22 extend in first and second axes parallel to each other. When the foldable bicycle 1 is folded, the rear frame 20 is folded relative to the front frame 10 to bring the rear wheel 23 to face the front wheel 14, as shown in FIG. 4.

Figure 8:
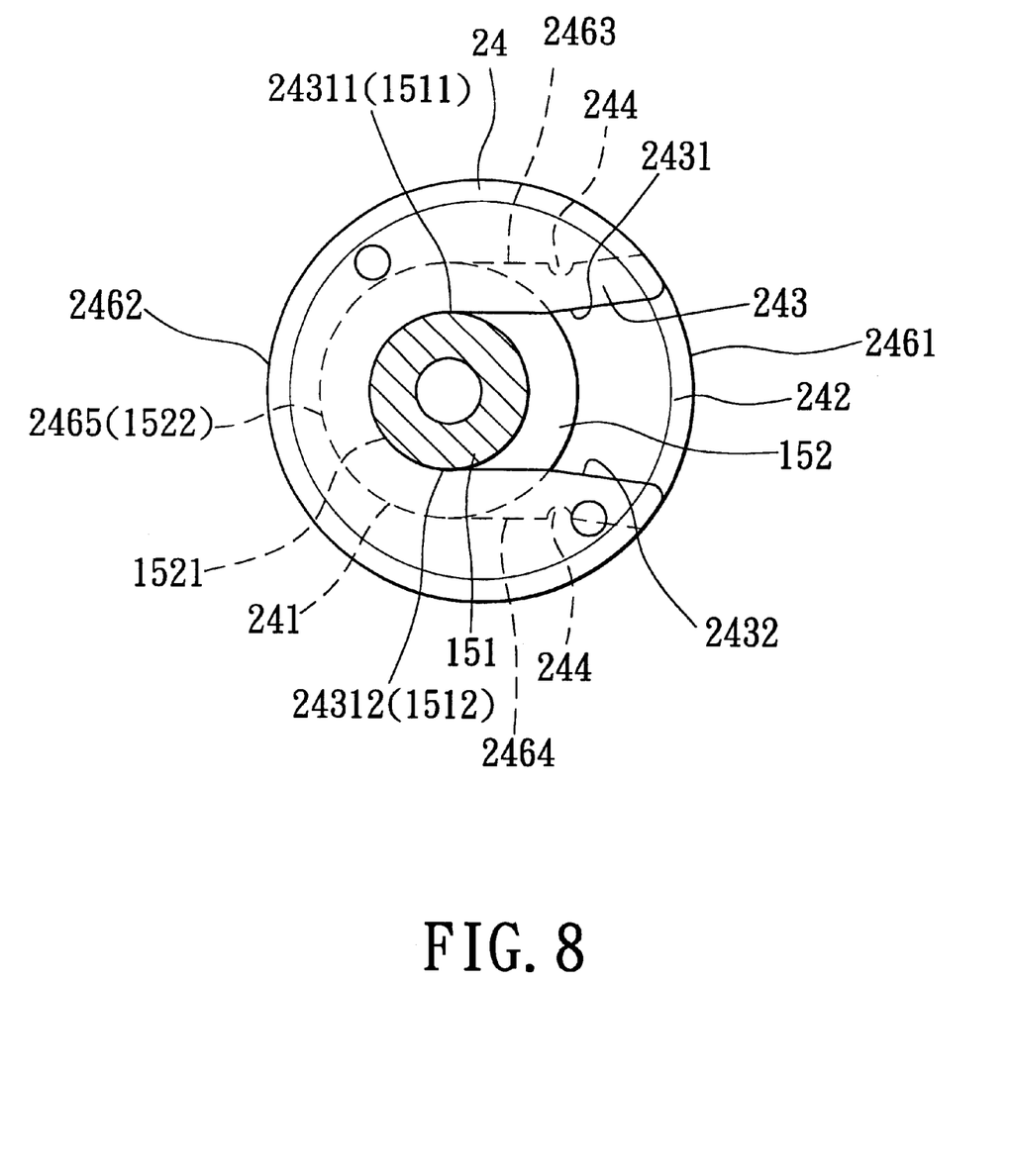
FIG. 8 is a partly sectional view showing the front anchored member and the rear anchoring member when joined with each other.

As shown in FIG. 3, the rear anchoring member 24 is adapted to be secured to the rear wheel axle 22 and outboard to the rear wheel 23. The rear anchoring member 24 includes an outer lateral wall 243 which has a first periphery, and which is adapted to be disposed opposite to the rear wheel 23 in a first axial direction parallel to the first axis of the rear wheel axle 22, and a circumferential wall 246 which extends from the first periphery of the outer lateral wall 243 in the first axial direction and towards the rear wheel 23. The circumferential wall 246 includes front and rear wall portions 2461,2462 opposite to each other in a first direction transverse to the first axial direction. With reference to FIG. 8, upper and lower guideways 2463,2464 extend from the front wall portion 2461 rearwardly in the first transverse direction. A semi-circular first abutment wall 2465 extends in the first axial direction and in a second transverse direction transverse to both the first axial direction and the first transverse direction, and has upper and lower ends which are joined with the upper and lower guideways 2463,2464, respectively, so as to confine an insert slot 241 thereamong. A first distance is defined from the first abutment wall 2465 to the front wall portion 2461. A pair of protrusions 244 are disposed respectively on the upper and lower guideways 2463 adjacent to the front wall portion 2461.

Referring again to FIGS. 3 and 8, the outer lateral wall 243 includes upper and lower guiding surfaces 2431,2432 which respectively extend in the first transverse direction and forwards to communicate with the front wall portion 2461, and rearwards to upper and lower terminal portions 24311,24321. The upper and lower terminal portions 24311, 24321 respectively define with the front wall portion 2461, second and third distances, each of which is shorter than the first distance. The upper and lower guiding surfaces 2431, 2432 respectively extend in the first axial direction, and are disposed to be spaced apart from each other by a fourth distance in the second transverse direction so as to confine a cutout portion 242 which is communicated with the insert slot 241.

Figure 7:
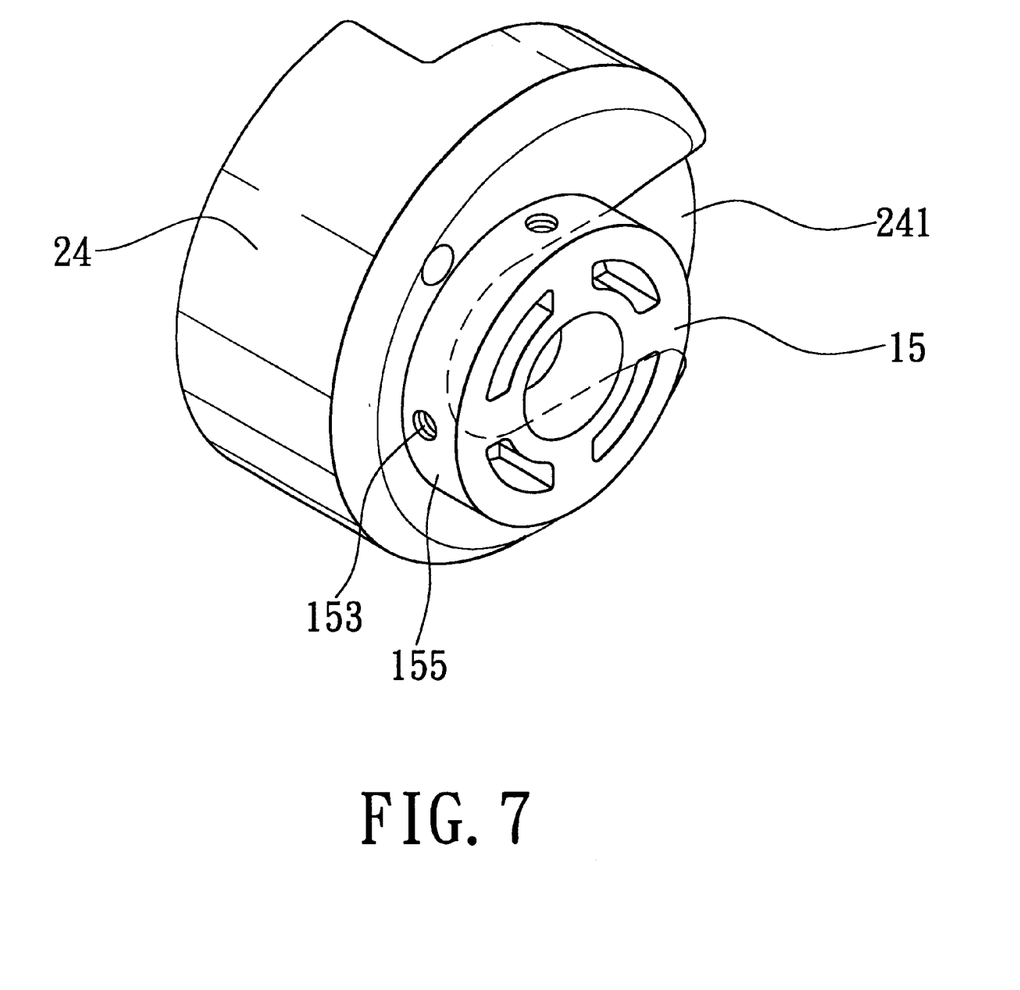
FIG. 7 is a perspective view showing the front anchored member when joined with the rear anchoring member.

With reference to FIGS. 2, 7 and 8, the front anchored member 15 includes an annular mounting portion 155 which is adapted to be sleeved securely on the front wheel axle 13 and outboard to the front wheel 14 by virtue of screw fasteners 154 that are inserted threadedly into screw holes 153 formed therein and the front wheel axle 13 so as to prevent the annular mounting portion 155 on the front wheel axle 13 from sliding in the second axial direction.

Figure 5:
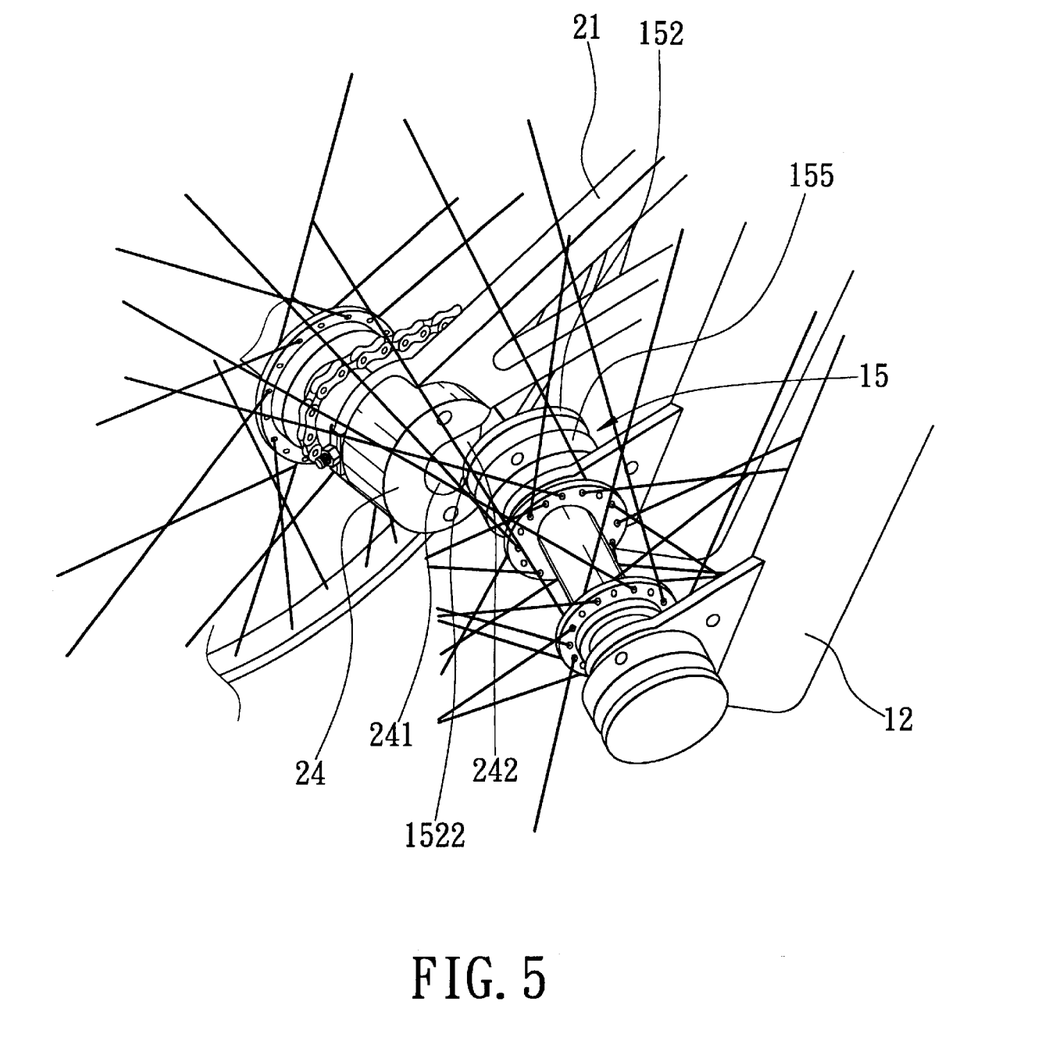
FIG. 5 is a perspective view showing how the front anchored member is joined with the rear anchoring member.

With reference to FIGS. 5 and 8, the front anchored member 15 further includes an inserted outer annular portion 152 which has an annular inner periphery 1521 that surrounds the second axis. The inserted outer annular portion 152 is of such a thickness in a second axial direction parallel to the second axis as to be insertable into the insert slot 241. The inserted outer annular portion 152 includes a second abutment wall 1522 which is disposed to be forward to the front wheel axle in the first transverse direction, and which extends in the second axial direction. As such, when the front wheel 14 is folded to bring the second abutment wall 1522 to face the first abutment wall 2465, and when the inserted outer annular portion 152 is inserted into the insert slot 241, the second abutment wall 1522 can abut against the first abutment wall 2465.

Figure 6:
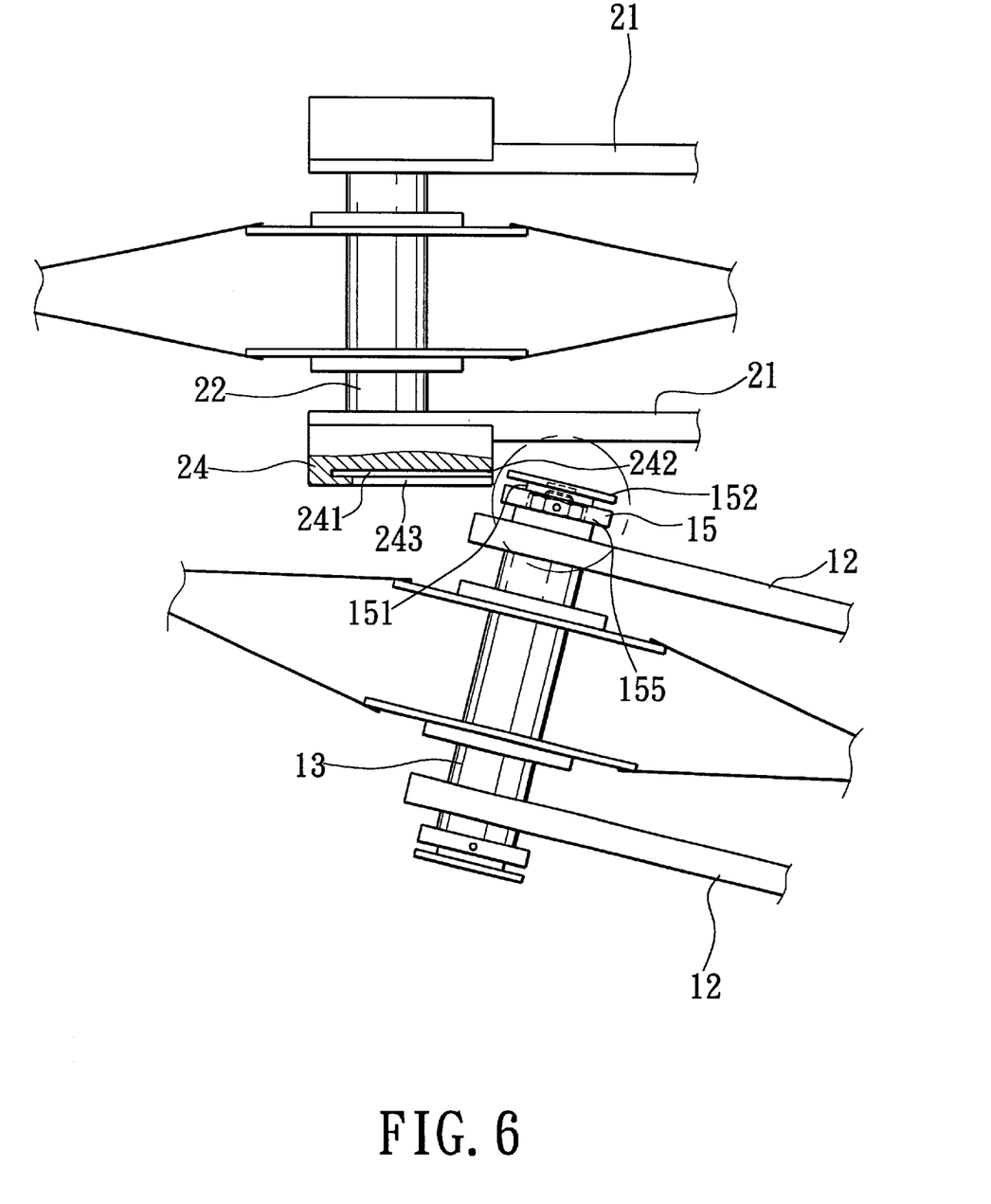
FIG. 6 is a partial sectional side view showing how the front anchored member is joined with the rear anchoring member.

With reference to FIGS. 6 and 8, a guided annular portion 151 is disposed to extend from the annular inner periphery 1521 of the inserted outer annular portion 152 in the first axial direction and towards the annular mounting portion 155, and has upper and lower contact parts 1511,1512 opposite to each other in the second transverse direction. Thus, when the inserted outer annular portion 152 is brought to be inserted into the insert slot 241 in the first transverse direction, the upper and lower contact parts 1511,1512 will slidably engage the upper and lower guiding surfaces 2431, 2432 of the outer lateral wall 243, respectively.

By virtue of the protrusions 244, when the inserted outer annular portion 152 is inserted into the insert slot 241 in the first transverse direction, the inserted outer annular portion 152 slides retainingly over the protrusions 244.

As mentioned above, the inserted outer annular portion 152 is inserted into the insert slot 241 in the first transverse direction by sliding of the upper and lower contact parts 1511,1512 of the guided annular portion 151 along the upper and lower guiding surfaces 2431,2432. As such, the front anchored member 15 can be easily retained on the rear anchoring member 24 when the front frame 10 of the foldable bicycle 1 is folded towards the rear frame 20.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foldable bicycle comprising:

rear and front frames respectively having rear and front wheel axles that extend in first and second axes parallel to each other, and that are provided with rear and front wheels mounted respectively thereon;

a rear anchoring member secured to said rear wheel axle and outboard to said rear wheel, and including:
  an outer lateral wall having a first periphery, and disposed opposite to said rear wheel in a first axial direction parallel to the first axis, and
  a circumferential wall extending from said first periphery of said outer lateral wall in the first axial direction and towards said rear wheel, and including front and rear wall portions opposite to each other in a first direction transverse to the first axial direction, said front wall portion defining an insert slot disposed to extend towards said rear wall portion to form a first abutment wall which extends in the first axial direction and in a second transverse direction transverse to both the first axial direction and the first transverse direction, and which defines a first distance with said front wall portion, wherein
  said outer lateral wall includes upper and lower guiding surfaces respectively extending in the first transverse direction and forwards to communicate with said front wall portion, and rearwards to upper and lower terminal portions which respectively define with said front wall portion, second and third distances, each of which is shorter than the first distance, said upper and lower guiding surfaces respectively extending in the first axial direction and being disposed to be spaced apart from each other by a fourth distance in the second transverse direction so as to confine a cutout portion communicated with said insert slot; and a front anchored member secured to said front wheel axle and outboard to said front wheel, and including:
  an inserted outer annular portion having an annular inner periphery thereof surrounding the second axis, said inserted outer annular portion being of such a thickness in a second axial direction parallel to the second axis as to be insertable into said insert slot, said inserted outer annular portion including a second abutment wall disposed to be forward to said front wheel axle in the first transverse direction, and extending in the second axial direction so as to abut against said first abutment wall when said front wheel is folded to thereby bring said second abutment wall to face said first abutment wall, and said inserted outer annular portion is inserted into said insert slot, and a guided annular portion disposed to extend from said annular inner periphery of said inserted outer annular portion in the first axial direction and towards said front wheel, and having upper and lower contact parts opposite to each other in the second transverse direction such that when said inserted outer annular portion is brought to be inserted into said insert slot in the first transverse direction, said upper and lower contact parts will slidably engage said upper and lower guiding surfaces, respectively.

2. The foldable bicycle as claimed in claim 1, wherein said first abutment wall is semi-circular, and has upper and lower ends opposed to each other in the second transverse direction, said rear anchoring member further including upper and lower guideways extending from said front wall portion rearwardly and in the first transverse direction, respectively joined with said upper and lower ends of said first abutment wall, and cooperating with said first abutment wall to confine said insert slot.

3. The foldable bicycle as claimed in claim 2, wherein said rear anchoring member further includes a plurality of protrusions disposed on said upper and lower guideways adjacent to said front wall portion such that when said inserted outer annular portion is inserted into said insert slot in the first transverse direction, said inserted outer annular portion slides retainingly over said protrusions.

4. The foldable bicycle as claimed in claim 1, wherein said front anchored member further includes an annular mounting portion disposed inboard to said guided annular portion, spaced apart from said inserted outer annular portion by said guided annular portion, and mounted on said front wheel axle.

5. The foldable bicycle as claimed in claim 4, wherein said annular mounting portion is slidable relative to said front wheel axle, said front anchored member further including a plurality of screw fasteners to prevent said annular mounting portion on said front wheel axle from sliding in the second axial direction.

6. A positioning device adapted to position a rear frame of a foldable bicycle relative to a front frame when the foldable bicycle is folded, the rear and front frames respectively having rear and front wheel axles that extend in first and second axes parallel to each other, and that are provided with rear and front wheels mounted respectively thereon, said positioning device comprising:

a rear anchoring member adapted to be secured to the rear wheel axle and outboard to the rear wheel, and including:

an outer lateral wall having a first periphery, and adapted to be disposed opposite to the rear wheel in a first axial direction parallel to the first axis, a circumferential wall extending from said first periphery of said outer lateral wall in the first axial direction and towards the rear wheel, and including front and rear wall portions opposite to each other in a first direction transverse to the first axial direction, said front wall portion defining an insert slot disposed to extend towards said rear wall portion to form a first abutment wall which extends in the first axial direction and in a second transverse direction transverse to both the first axial direction and the first transverse direction, and which defines a first distance with said front wall portion, said first abutment wall being semi-circular, and having upper and lower ends opposed to each other in the second transverse direction, wherein said outer lateral wall includes upper and lower guiding surfaces respectively extending in the first transverse direction and forwards to communicate with said front wall portion, and rearwards to upper and lower terminal portions which respectively define with said front wall portion, second and third distances, each of which is shorter than the first distance, said upper and lower guiding surfaces respectively extending in the first axial direction and being disposed to be spaced apart from each other by a fourth distance in the second transverse direction so as to confine a cutout portion communicated with said insert slot, and upper and lower guideways extending from said front wall portion rearwardly and in the first transverse direction, respectively joined with said upper and lower ends of said first abutment wall, and cooperating with said first abutment wall to confine said insert slot; and a front anchored member adapted to be secured to the front wheel axle and outboard to the front wheel, and including:

an inserted outer annular portion having an annular inner periphery thereof surrounding the second axis, said inserted outer annular portion being of such a thickness in a second axial direction parallel to the second axis as to be insertable into said insert slot, said inserted outer annular portion including a second abutment wall disposed to be forward to the front wheel axle in the first transverse direction, and extending in the second axial direction so as to abut against said first abutment wall when the front wheel is folded to thereby bring said second abutment wall to face said first abutment wall, and said inserted outer annular portion is inserted into said insert slot, and a guided annular portion disposed to extend from said annular inner periphery of said inserted outer annular portion in the first axial direction and towards the front wheel, and having upper and lower contact parts opposite to each other in the second transverse direction such that when said inserted outer annular portion is brought to be inserted into said insert slot in the first transverse direction, said upper and lower contact parts will slidably engage said upper and lower guiding surfaces, respectively;

said rear anchoring member further including a plurality of protrusions disposed on said upper and lower guideways adjacent to said front wall portion such that when said inserted outer annular portion is inserted into said insert slot in the first transverse direction, said inserted outer annular portion slides retainingly over said protrusions.

7. The positioning device as claimed in claim 6, wherein said front anchored member further includes an annular mounting portion disposed inboard to said guided annular portion, spaced apart from said inserted outer annular portion by said guided annular portion, and adapted to be mounted on the front wheel axle, said annular mounting portion being adapted to be slidable relative to the front wheel axle, said front anchored member further including a plurality of screw fasteners adapted to prevent said annular mounting portion on the front wheel axle from sliding in the second axial direction.

8. A positioning device adapted to position a rear frame of a foldable bicycle relative to a front frame when the foldable bicycle is folded, the rear and front frames respectively having rear and front wheel axles that extend in first and second axes parallel to each other, and that are provided with rear and front wheels mounted respectively thereon, said positioning device comprising:

a rear anchoring member adapted to be secured to the rear wheel axle and outboard to the rear wheel, and including:

an outer lateral wall having a first periphery, and adapted to be disposed opposite to the rear wheel in a first axial direction parallel to the first axis, and a circumferential wall extending from said first periphery of said outer lateral wall in the first axial direction and towards the rear wheel, and including front and rear wall portions opposite to each other in a first direction transverse to the first axial direction, said front wall portion defining an insert slot disposed to extend toward said rear wall portion to form a first abutment wall which extends in the first axial direction and in a second transverse direction transverse to both the first axial direction and the first transverse direction, and which defines a first distance with said front wall portion, wherein said outer lateral wall includes upper and lower guiding surfaces respectively extending in the first transverse direction and forwards to communicate with said front wall portion, and rearwards to upper and lower terminal portions which respectively define with said front wall portion, second and third distances, each of which is shorter than the first distance, said upper and lower guiding surfaces respectively extending in the first axial direction and being disposed to be spaced apart from each other by a fourth distance in the second transverse direction so as to confine a cutout portion communicated with said insert slot;

a front anchored member adapted to be secured to the front wheel axle and outward to the front wheel, and including:

an inserted outer annular portion having an annular inner periphery thereof surrounding the second axis, said inserted outer annular portion being of such a thickness in a second axial direction parallel to the second axis as to be insertable into said insert slot, said inserted outer annular portion including a second abutment wall disposed to be forward to the front wheel axle in the first transverse direction, and extending in the second axial direction so as to abut against said first abutment wall when the front wheel is folded to thereby bring said second abutment wall to face said first abutment wall, and said inserted outer annular portion is inserted into said insert slot, and a guided annular portion disposed to extend from said annular inner periphery of said inserted outer annular portion in the first axial direction and towards the front wheel, and having upper and lower contact parts opposite to each other in the second transverse direction such that when said inserted outer annular portion is brought to be inserted into said insert slot in the first transverse direction, said upper and lower contact parts will slidably engage said upper and lower guiding surfaces, respectively said front anchored member further including an annular mounting portion disposed inboard to said guided annular portion, spaced apart from said inserted outer annular portion by said guided annular portion, and adapted to be mounted on the front wheel axle; and wherein said annular mounting portion is adapted to be slidable relative to the front wheel axle, said front anchored member further including a plurality of screw fasteners adapted to prevent said annular mounting portion on the front wheel axle from sliding in the second axial direction.

\* \* \* \* \*